United States Patent [19]
Stephens, Jr.

[11] 3,774,421
[45] Nov. 27, 1973

[54] INTERNAL TRI-LOCK BICYCLE LOCKING SYSTEM

[76] Inventor: Raymond E. Stephens, Jr., 14840 Sunset Blvd., Pacific Palisades, Calif. 90272

[22] Filed: July 17, 1972

[21] Appl. No.: 272,480

[52] U.S. Cl..................... 70/234, 70/186, 70/236
[51] Int. Cl....... B62h 5/06, B62h 5/10, E05b 71/00
[58] Field of Search..................... 70/49, 186, 233, 70/235, 236, 234; 280/272, 289

[56] References Cited
UNITED STATES PATENTS

| | | | |
|---|---|---|---|
| 814,034 | 3/1906 | Fry.................................. | 70/233 X |
| 1,140,751 | 5/1915 | Leksuczin......................... | 70/236 X |
| 1,991,825 | 2/1935 | Strickland......................... | 70/233 |
| 2,055,149 | 9/1936 | Hershbain......................... | 70/233 |

Primary Examiner—Marvin A. Champion
Assistant Examiner—Richard P. Tremblay
Attorney—Finkelstein & Mueth

[57] ABSTRACT

A bicycle antitheft device having a bicycle frame comprising a tubing portion, a pair of slidable rods within said tubing portion, one end of one of said rods being adapted to engage the neck of the bicycle fork to prevent the turning thereof, one end of the other of said rods being adapted to engage the sprocket mechanism to prevent the rotation thereof, means within said tubing for biasing said rods so that said ends are not engaged by said neck and sprocket mechanism, a key operated opening external to said tubing and mounted thereon, means for overcoming said means for biasing said rods in operable relation with said key operated opening said means for overcoming causing engagement of said ends of said rods with said neck and sprocket mechanism upon the turning of a key within said key operated opening, an opening in said tubing for receiving a portion of a means for wrapping and retaining the bicycle to a stationary external object, means within said opening in said tubing for engaging said portion of said means for wrapping and retaining, said means for engaging being brought into engagement with said portion by the turning of said key.

7 Claims, 4 Drawing Figures

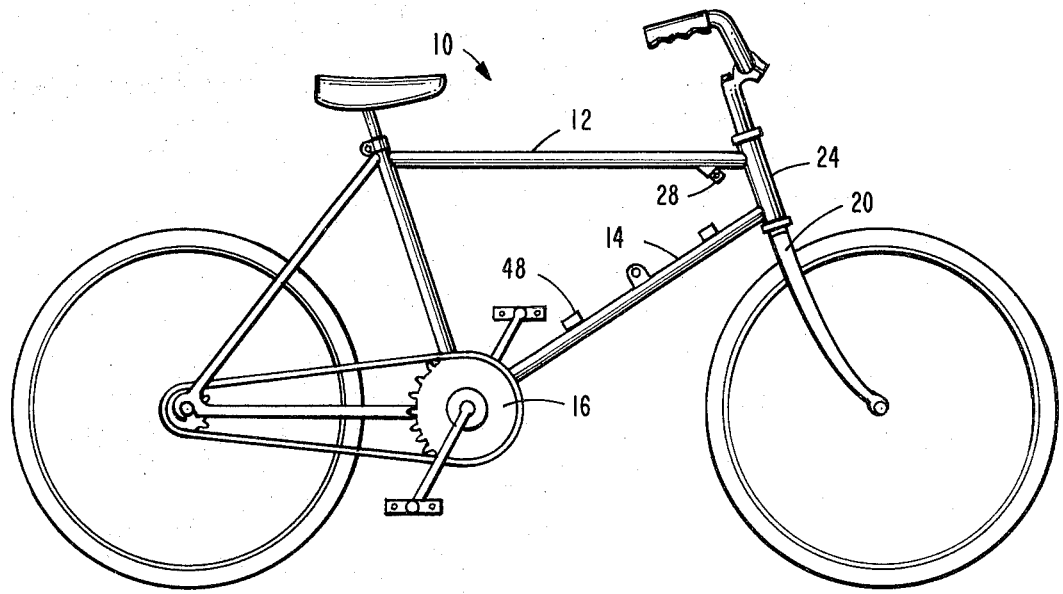
FIG.—1
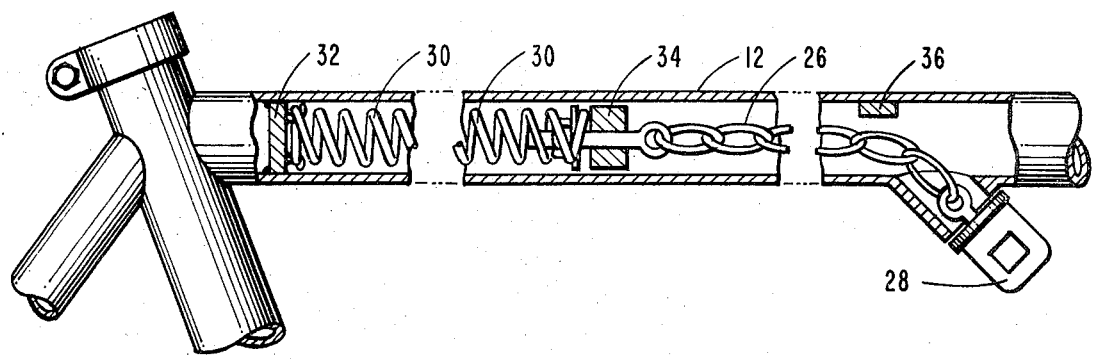
FIG.—2

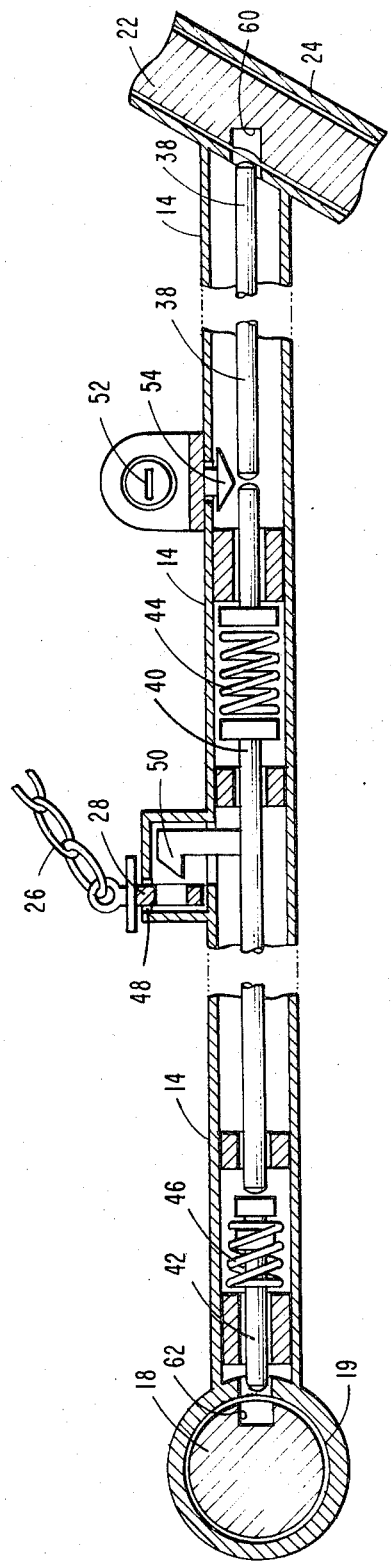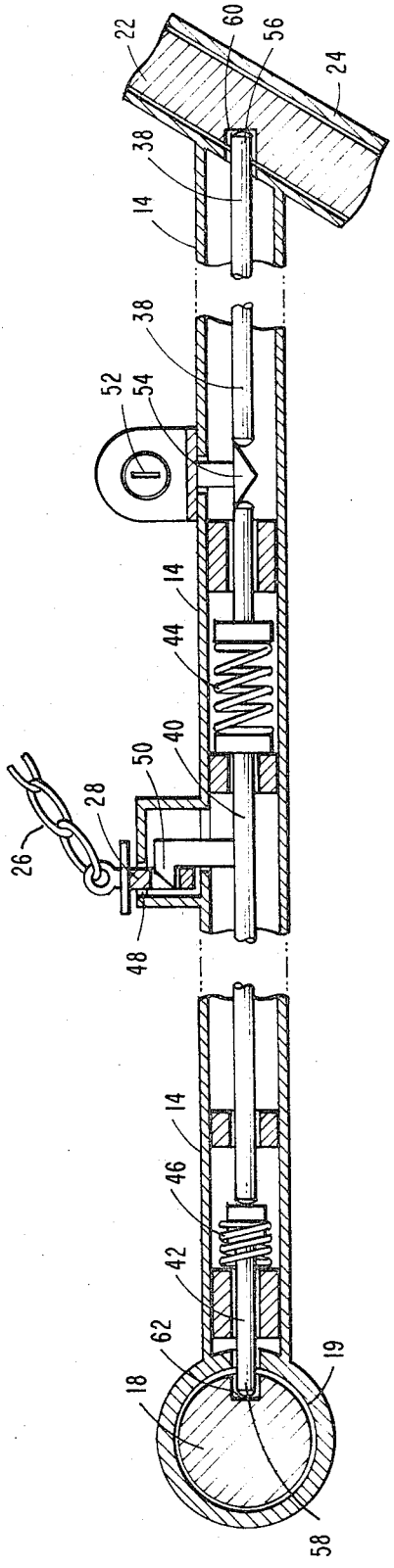

INTERNAL TRI-LOCK BICYCLE LOCKING SYSTEM

BACKGROUND OF THE INVENTION

The theft of bicycles is now a major problem in this and other countries. Over the years, various antitheft devices have been proposed for use on or in connection with bicycles.

For example, chain devices have been proposed to attach a bicycle to a stationary object. Locking devices for the sprocket mechanism and the neck of the fork have also been suggested. U. S. Letters Pat. No. 2,055,149 to Hershbain discloses a lock comprising a pair of racks and gear mechanism suitably encased and communicating with a lock outlet and having a bolt extended from one of said racks adapted to engage a rotary member and a spring bolt carried by the other rack, adapted to engage a steering post, and a lock mechanism stopping said outlet. The present invention significantly advances the art by providing a combination wherein the locking of the sprocket and neck of the fork, and the chaining of the bicycle to a stationary object can be accomplished using one key operated opening. Thus, a multiplicity of cumbersome operations is eliminated. Further, the device of this invention increases the probability that the device will be actually used by the bicycle operator. It is to be expected that this invention will be widely adopted in the art.

SUMMARY OF THE INVENTION

Briefly, the invention comprises a bicycle anti-theft device comprising:

a. a bicycle frame comprising a tubing portion, b. a pair of slidable rods within said tubing portion, one end of one of said rods being adapted to engage the neck of the bicycle fork to prevent the turning thereof, one end of the other of said rods being adapted to engage the sprocket mechanism to prevent the rotation thereof, c. means within said tubing for biasing said rods so that said ends are not engaged by said neck and sprocket mechanism, d. a key operated opening external to said tubing and mounted thereon, means for overcoming said means for biasing said rods in operable relation with said key operated opening, said means for overcoming causing engagement of said ends of said rods with said neck and sprocket mechanism upon the turning of a key within said key operated opening, e. an opening in said tubing for receiving a portion of a means for wrapping and retaining the bicycle to a stationary external object, f. means within said opening in said tubing for engaging said portion of said means for wrapping and retaining said means for engaging being brought into engagement with said portion by the turning of said key.

It is an object of my invention to provide a novel bicycle locking device.

It is a further object of this invention to provide a device which restrains the bicycle against being carried or driven away.

A further object of this invention is to provide a device for preventing the theft of bicycles wherein a plurality of antikheft functions are accomplished simultaneously at a single key operated opening.

These and other objects and advantages of this invention will be apparent from the following detailed description taken in conjunction with the accompanying drawings.

DESCRIPTION OF THE PREFERRED EMBODIMENTS

Turning to the drawings:

FIG. 1 is a side view of a bicycle equipped with the device of this invention.

FIG. 2 is an enlarged view in partial section of the upper bar or tubing of the frame connecting the tubing which carries the seat with the tubing around the neck of the fork.

FIG. 3 shows in section the tubing running from the area of the sprocket to the neck with the device in the unlocked mode.

FIG. 4 shows the structure of FIG. 3 in the locked mode.

Considering the drawings in greater detail, the bicycle 10 is provided with upper tubing 12 and angled tubing 14. The sprocket 16 has a shaft 18 received in the frame opening 19 in conventional manner. The fork 20 has a neck 22. The neck 22 is received in the tubular collar 24. The chain 26 is normally received in tubing 12 when not in use and is provided at one end with an engagement portion 28 having the purpose and function hereinafter more fully explained. The spring 30 is fixedly connected to the interior of tubing 12 at point 32. The chain 26 is connected to the other end of spring 30 so that the chain 26 can be withdrawn from tubing 12 by pulling on portion 28, thereby overcoming the bias of spring 30 tending to retain the chain 26 within tubing 12, stop 34 is a limiting device which prevents the overtensioning of spring 30 when it engages block 36.

In the preferred embodiment shown in the drawings, the tubing 14 is provided with rods 38, 40, and 42 and biasing springs 44 and 46. When the device is not in use, the springs 44 and 46 keep the rods positioned as shown in FIG. 3. Tubing 14 is also provided with opening 48 which, in use, is adapted to receive portion 28 of chain 26, the hook-like projection 50 on rod 40 is adapted to engage and hold portion 28, as shown in FIG. 4. The key operated opening 52 is rotatable by a key (not shown) to cause the extension of element 54 as shown in FIG. 4 to overcome the bias of springs 44 and 46, and move the rods 38, 40 (and projection 50) and 42 into the positions shown in FIG. 4. The free ends 56 and 58 of rods 38 and 42 are received in openings 60 and 62 in the neck 22 of the fork and sprocket shaft 18, respectively.

It is understood that, with the lock engaged, the rod 38 is spring biased into engagement with neck 22 in the same manner as sprocket 18 and rod 58, and hence this engagement need not be further illustrated in the drawings.

In operation, the bicycle is secured simply by withdrawing chain 26 from tubing 12, wrapping the chain around a stationary external object such as a post or tree, and then insert portion 28 in opening 48. The key operated opening 52 is then rotated causing the engagement of rods 38 and 42 and projection 50 with the neck of the fork 22, sprocket shaft 18 and portion 28, respectively.

Many variations are possible in my invention. The chain need not be carried in the horizontal tubing a shown. Any convenient tubing may be used for this purpose. The exact type of engagement or interlock of the rods with the fork and/or sprocket is subject to many variations which will occur to those skilled in the art.

In summary, this invention provides a complete bicycle security system which locks sprocket and steering as well as providing a completely retractable chain lock for securing the bicycle to a stationary object. All three locks are activated by a half turn of a key and all cmponents being built into the frame of the bicycle. Even if the chain is cut and the bicycle stolen the frame must be cut to remove the locking elements, thus destroying the bicycle. The lock not only prevents th sprocket and steering from operating but also prevents the removal of the sprocket and steering mechanisms from their housings. In addition, neither sprocket nor steering need be in any particular position when the lock is engaged. Because locking bolts for sprocket, steering and chain are spring loaded, they will activate themselves when rotated. The completely retractable chain lock is built into the frame member of the cycle so it cannot be lost or tampered with. The chain is out of the way but ready for immediate use.

Having fully described the invention, it is intended that it be limited only by the lawful scope of the appended claims.

I claim:
1. A bicycle anti-theft device comprising:
   a. a bicycle frame comprising a tubing portion,
   b. a pair of slidable rods within said tubing portion, one end of one of said rods being adapted to engage the neck of the bicycle fork to prevent the turning thereof, one end of the other of said rods being adapted to engage the sprocket mechanism to prevent the rotation thereof,
   c. means within said tubing for biasing said rods so that said ends are not engaged by said neck and sprocket mechanism,
   d. a key operated opening external to said tubing and mounted thereon, means for overcoming said means for biasing said rods in operable relation with said key operated opening, said means for overcoming causing engagement of said ends of said rods with said neck and sprocket mechanism upon the turning of a key within said key operated opening,
   e. an opening in said tubing for receiving a portion of a means for wrapping and retaining the bicycle to a stationary external object,
   f. means within said opening in said tubing for engaging said portion of said means for wrapping sand retaining said means for engaging being brought into engagement with said portion by the turning of said key.

2. The device of claim 1 wherein said means for wrapping and retaining is slidably receivable within a second portion of tubing of the bicycle frame.

3. The device of claim 2 wherein said means for wrapping and retaining is a chain which is held at one end by a spring which normally holds the chain within said second portion of the tubing.

4. The device of claim 1 wherein said pair of rods are separated by and in end-to-end alignment with a third rod, said third rod carrying said means within said opening in said tubing for engaging said portion of said means for wrapping and retaining.

5. The device of claim 1 wherein said means for biasing are springs.

6. The device of claim 1 wherein the said ends of said rods are received in said neck and sprocket mechanism.

7. The device of claim 3 wherein the chain is provided with means for limiting the withdrawal of the chain from said tubing.

* * * * *